United States Patent [19]

Ishida et al.

[11] Patent Number: 5,413,420
[45] Date of Patent: May 9, 1995

[54] WORDPROCESSING DEVICE

[75] Inventors: Kazuko Ishida, Kounan; Kengo Omura, Toyoake, both of Japan

[73] Assignee: Brother Kogyo Kabushiki Kaisha, Aichi, Japan

[21] Appl. No.: 71,651

[22] Filed: Jun. 1, 1993

[30] Foreign Application Priority Data

Jun. 1, 1992 [JP] Japan ............... 4-166912

[51] Int. Cl.⁶ ............................................. G06F 5/00
[52] U.S. Cl. ................................. 400/61; 400/615.2; 395/151
[58] Field of Search ............... 400/63, 76, 121, 615.2, 400/61; 395/110, 150, 151

[56] References Cited

U.S. PATENT DOCUMENTS

| | | | |
|---|---|---|---|
| 4,907,173 | 3/1990 | Yamada et al. | 400/63 |
| 4,916,656 | 4/1990 | Sasaki | 364/900 |
| 5,090,826 | 2/1992 | Morioka | 400/63 |
| 5,188,469 | 2/1993 | Nagao | 400/615.2 |

FOREIGN PATENT DOCUMENTS

| | | | |
|---|---|---|---|
| 0089468 | 9/1983 | European Pat. Off. | 400/63 |
| 0117892 | 9/1984 | European Pat. Off. | 400/63 |
| 318144 | 12/1989 | Japan | 400/63 |

OTHER PUBLICATIONS

IBM Technical Disclosure Bulletin. vol. 30, No. 9, Feb. 1988, New York US p. 161, XP96755 "Method to Provide Enhancements to Underline, Bold and Overstrike Functions".
Patent Abstracts of Japan vol. 12, No. 226 (P-772) 28 Jun. 1988 & JP-A-63 020 677 (Brother Ind Ltd) 28 Jan. 1988.

*Primary Examiner*—David A. Wiecking
*Assistant Examiner*—Steven S. Kelley
*Attorney, Agent, or Firm*—Kane, Dalsimer, Sullivan, Kurucz, Levy, Eisele and Richard

[57] ABSTRACT

A wordprocessing device having a keyboard which can input characters having a plurality of attributes. The character string can be modified when output such that all the characters have a common attribute, while the original character string data remains unmodified, stored in a memory, for further use. The modified character string can then be output by a printer onto a recording medium such as a tape.

14 Claims, 9 Drawing Sheets

TB 1

| CHARACTER CODE | INDEX ADDRESS |
|---|---|
| A | A 000 |
| B | B 000 |
| C | C 000 |
| D | D 000 |
| E | E 000 |
| ⋮ | ⋮ |
| Z | Z 000 |
| a | a 000 |
| b | b 000 |
| c | c 000 |
| d | d 000 |
| e | e 000 |
| ⋮ | ⋮ |
| z | z 000 |

FIG. 5

| CHARACTER CODE | INDEX ADDRESS |
|---|---|
| a | A 000 |
| b | B 000 |
| c | C 000 |
| d | D 000 |
| e | E 000 |
| ⋮ | ⋮ |
| z | Z 000 |

| CHARACTER CODE | INDEX ADDRESS |
|---|---|
| A | a 000 |
| B | b 000 |
| C | c 000 |
| D | d 000 |
| E | e 000 |
| ⋮ | ⋮ |
| Z | z 000 |

WORDPROCESSING DEVICE

FIELD OF THE INVENTION

The present invention relates to a wordprocessing device, and more particularly to a tape printing device, which can modify a character string containing characters having more than one attribute. The user can modify the input string such that all characters output have a common attribute; however the original character string data is retained in the memory of the wordprocessing device for future use.

BACKGROUND OF THE INVENTION

Conventional tape printing devices, provided with a dot print type printing mechanism include a keyboard for inputting characters having attributes such as upper case, lower case, boldfacing etc., a display unit, and a control unit comprising a character generator and text memory means. The character generator and text memory means store the dot pattern data for the alphanumeric characters. This allows characters input from the keyboard to be printed on a recording medium by the printing means.

In the conventional art, the control unit consists of an index table in which the character codes are stored. The dot pattern data for characters having one or more attributes are stored in the index table. Thus, for example, the upper case characters input from the keyboard will address the upper case dot pattern data stored in the index table. Similarly the lower case characters will address the lower case dot pattern data stored in the index table. Thus a character string consisting of characters having a first attribute arid characters having a second attribute will address the dot pattern data stored in the index table corresponding to the characters having the respective attributes. In other words, a character string consisting of lower case and upper case characters will address both the lower case and upper case dot pattern data stored in the index table. This data is then read out, and transferred to the printing means to produce the output on the recording medium.

In the conventional tape printing device, after a character string consisting of characters having more than one attribute has been input, there may be the need to modify the string such that all of the characters to be output have the same attribute. However, since the input characters address their respective dot pattern data, a change to another attribute requires that the original character be deleted and the new character be input. Thus, for example, if a character string having lower and upper case characters has been input, there may be the need to modify the string such that all of the characters are either upper case or lower case. However, since the input characters address their respective dot pattern data, a change to the opposite ease requires that the original character be deleted and the new character be input.

Also, the original character string must be separately stored in the memory if it is to be used later. Therefore, in the conventional tape printing device, changing a character string consisting of characters having more than one attribute, to a character string having only one attribute is a time consuming and inefficient process.

SUMMARY OF THE INVENTION

It is therefore an object of the present invention to provide a wordprocessing device by which a character string consisting of characters having more than one attribute that have been input, may be easily modified such that when output, all the characters have a common attribute such as upper case or lower case. Also in the invention, the original character string data shall remain unmodified so that it may be used later in its original form.

To accomplish the above objective there is provided a wordprocessing device which comprises:
input means for inputting character codes, each of said character codes representing a character and one of a plurality of attribute information;
memory means for storing said character codes input through said input means;
a character generator for generating said output character data, each output character data comprising a character having one attribute;
output attribute selecting means for selecting the attribute of the character to be outputted;
an index means for mapping said input character codes to said output character data, said output character data having an attribute that is selected by said output attribute selecting means; and
output control means for outputting characters corresponding to said stored character codes attribute selected by said attribute selecting means, with said stored character codes remaining unchanged.

According to another aspect of the invention, there its provided a tape printing device which comprises:
an input means for inputting character codes, said character codes comprising upper case character codes and lower case character codes;
memory means for storing said character codes input by said inputting means;
character generator having stored font data corresponding to said character codes, such that said font data is accessed by predetermined address data, said device further comprising:
a first index means for designating respective address data corresponding to said character codes;
a second index means for designating address data for upper case characters corresponding to lower case character codes;
an upper case character output indication means for indicating that all of the characters are to be output as upper case characters; and
an output means for outputting characters based upon upper case address data corresponding to upper case character code designated by said first index means as well as upper case address data corresponding to lower case character codes designated by second index means, in the case that it is indicated by said upper case output indication means that every character is to be output as an upper case character,
wherein said output means comprises a print means for printing characters on a tape like recording medium; and
wherein character codes stored in said memory means remain unchanged even after printing by said printing means.

DESCRIPTION OF THE ACCOMPANYING DRAWINGS

FIG. 5 is a chart showing the contents of the first (normal) index table;

FIG. 6 is a chart showing the contents of the second (upper case character) index table;

FIG. 7 is a chart showing the contents of the third (lower case character) index table;

DESCRIPTION OF THE EMBODIMENTS

The preferred embodiment is a tape printing device to which time present invention is applied; the tape printing device capable of printing many characters such as alphanumeric characters, symbols etc., each character capable of having one or more attributes (ie., fonts, or styles), oil a printing tape (tape as a print medium).

In this embodiment the character attributes used are the upper case and lower case character styles. However this invention is not limited to these attributes, but can include various character fonts (such as Courier, Times etc., each font having a plurality of point sizes, such as 10 point, 12 point etc.) as well as other styles (such as boldface, shadowing etc.).

Figure 1:
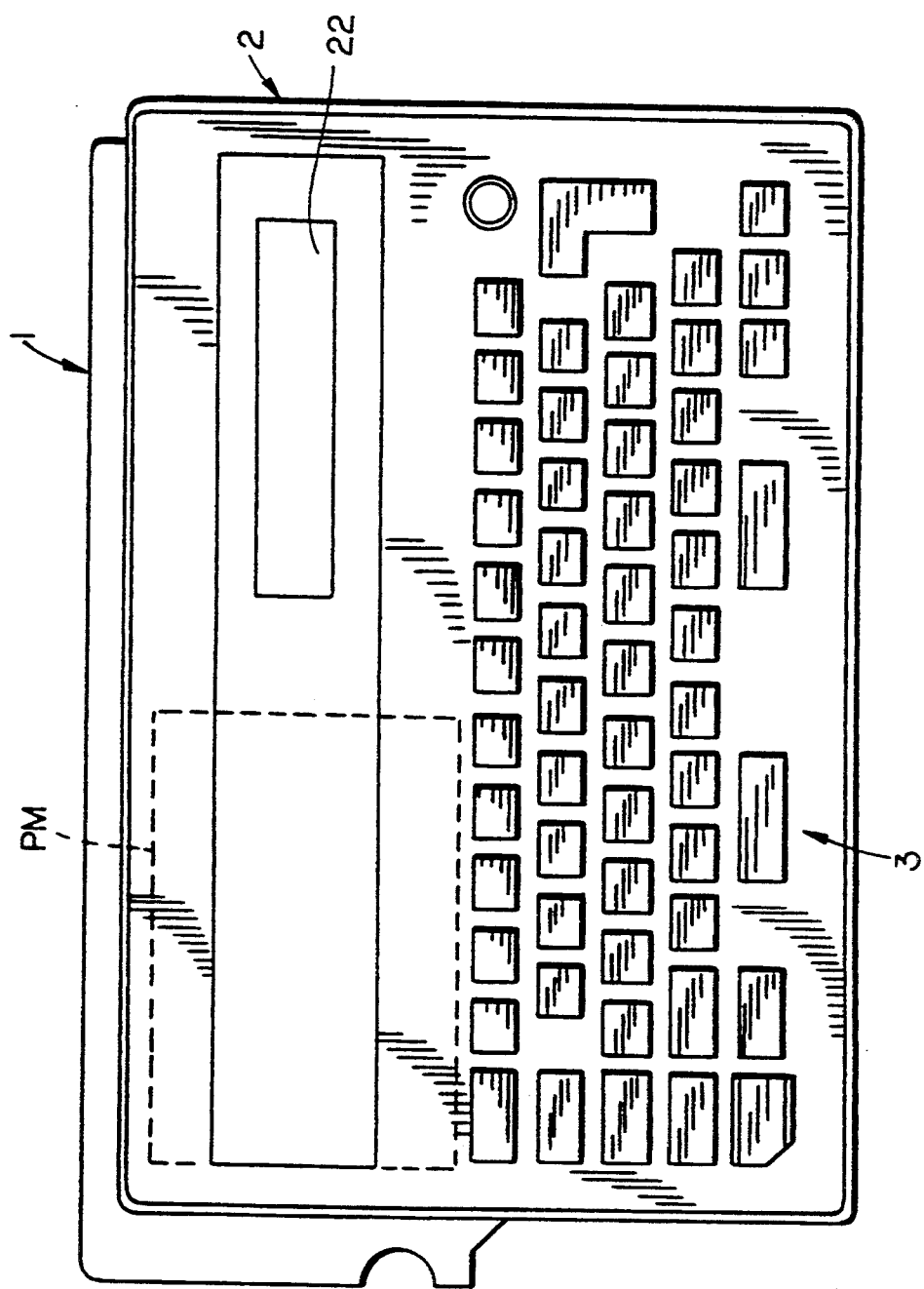
FIG. 1 is a top view of a tape printing device.

As shown in FIG. 1, a keyboard 3 is located at the top-front portion of the main body frame 2 of a tape printing device 1, a print mechanism PM is located in the main body frame 2 to the rear of the keyboard 3, and a liquid crystal display unit 22 capable of displaying characters and symbols is also located to the rear of the keyboard 3.

The keyboard 3 includes, character keys for inputting alphabet characters, numerals and symbols; a shift key (corresponding to a character attribute selection means) for selectively outputting an upper case character code and lower ease character code for the alphabet characters; a space key; a return key; cursor movement keys for moving a cursor to the right and left directions; a document creation key for creating a document; a format set key for setting a print format; a size set key for setting the size of a print character; a font set key for setting the font of print characters; a character mode set key for setting an alphabet character input mode; a print key for executing printing; a tape feed key for feeding a print tape 5; a power supply key for turning ON/OFF a power supply, etc.

Figure 2:
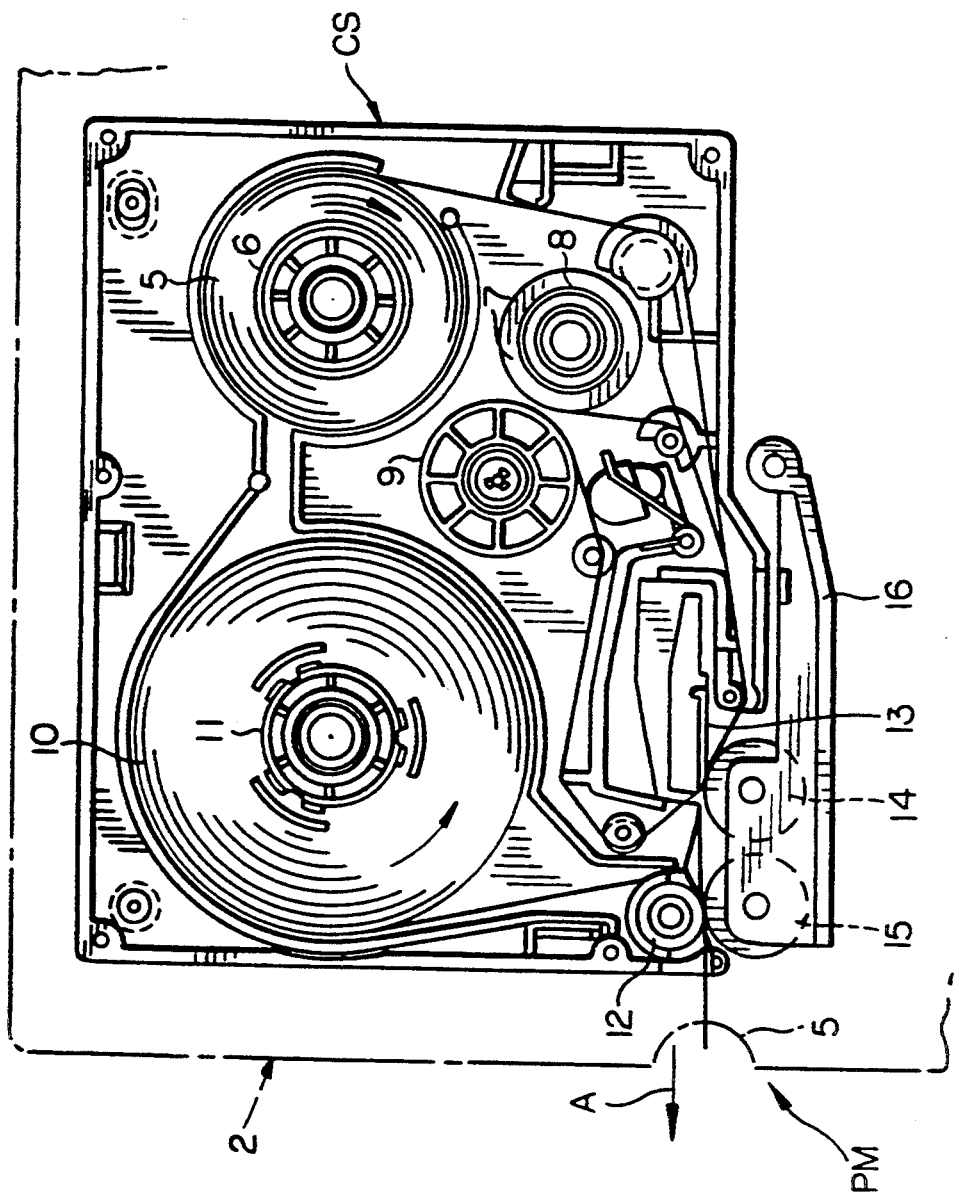
FIG. 2 is a top view of a print mechanism.

Next, the print mechanism PM will be briefly described with reference to FIG. 2. The print mechanism has a rectangular tape cassette CS detachably mounted to it. The tape cassette has rotatably mounted to it, a tape spool 6 around which the print tape 5 composed of a transparent film and having a width of about 9 mm or 12 mm is wound; a ribbon feed spool 8 around which an ink ribbon 7 is wound; a winding spool 9 for winding the ink ribbon 7; a feed spool 11 around which a double coated adhesive tape 10 having the same width as that of the print tape 5 is wound with its releasing paper facing to the outside; and a joint roller 12 for joining the print tape 5 to the double coated adhesive tape 10.

A thermal head 13 stands at the position where the print tape 5 is placed on the ink ribbon 7. A platen roller 14 for pressing the print tape 5 and ink ribbon 7 against the thermal head 13 and a feed roller 15 for pressing the print tape 5 and double coated adhesive tape 10 against the joint roller 12 are rotatably supported by a support member 16. The thermal head 13 includes a group of 128 heating elements (not shown), arranged vertically.

Therefore, widen the group of heating elements is energized while the joint roller 12 and winding spool 9 are driven in synchronized rotation by a tape feed motor 24 (refer to FIG. 2) driven in a predetermined direction, characters are printed on the print tape 5 with a plurality of dot strings. Further, the print tape 5 is fed in the tape feed direction A when it is in joint contact with the double coated adhesive tape 10. Note, for details about the print mechanism PM, refer to U.S. Pat. No. 5,188,469.

Figure 3:
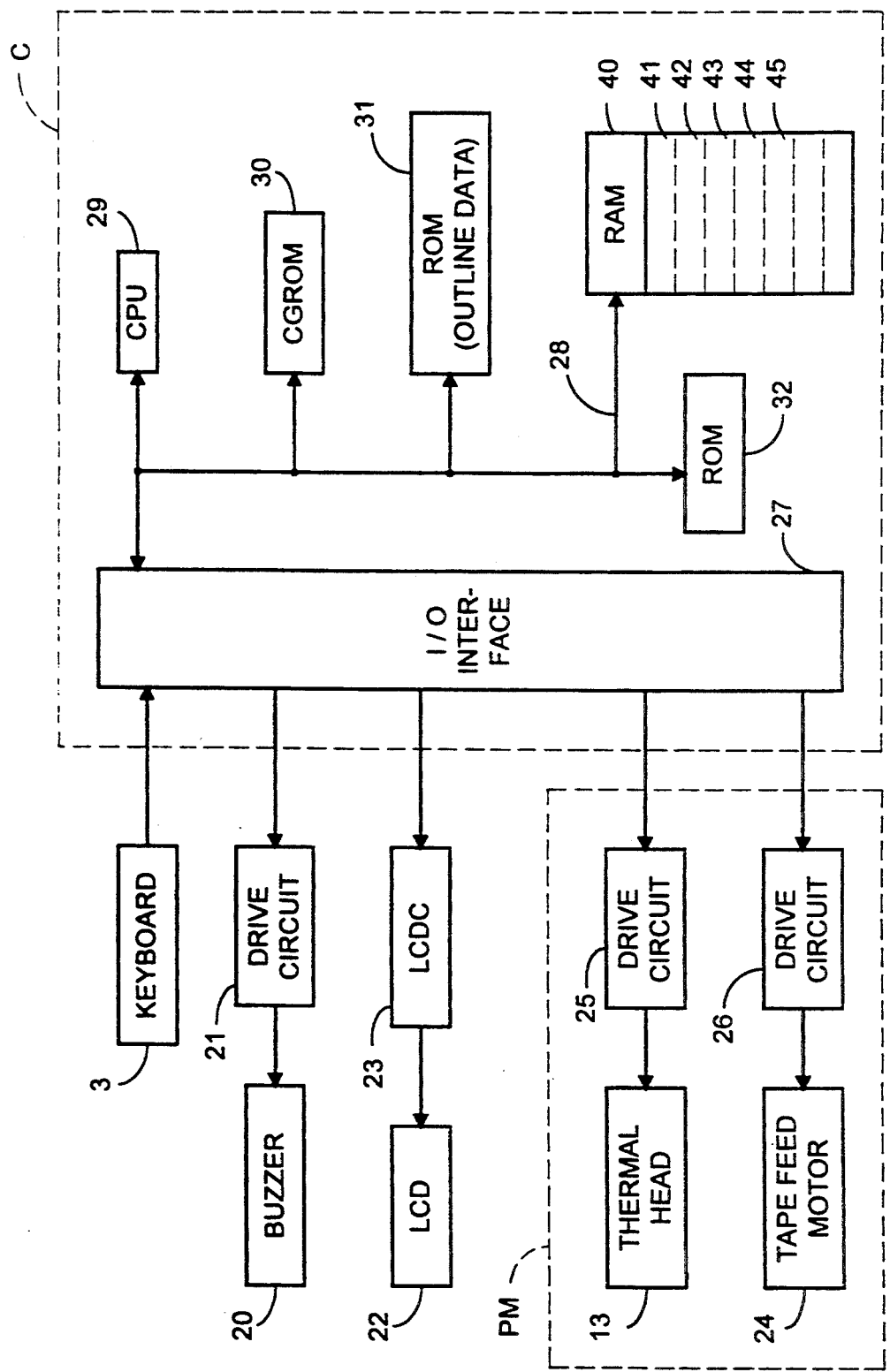
FIG. 3 is a block diagram of the control system of the tape printing device.

Next, the tape printing device 1 has a control system arranged as shown in the block diagram of FIG. 3.

The keyboard 8, a display controller (LCDC) 23 having a display RAM for outputting display data to the liquid crystal display (LCD) unit 22, drive circuit 25 for driving the thermal head 18, a drive circuit 26 for driving the tape feed motor 24, and a drive circuit for a warning buzzer 20 are connected to the I/O interface 27 of a control unit C. The display data is the processed data and allows the operator to see the results of the processing before the actual printing is done.

The control unit C is composed of a CPU 29, the I/O interface 27 connected to the CPU 29 through a bus 28 such as a data bus, a CGROM 30, ROMs 31, 32 and a RAM 40.

The CGROM (pattern data memory) 30 stores display dot pattern data for each character corresponding to the character code data.

The ROM (outline data memory) 31 serving as a character generator stores data for forming each character corresponding to the character code or symbol code.

Figure 4:
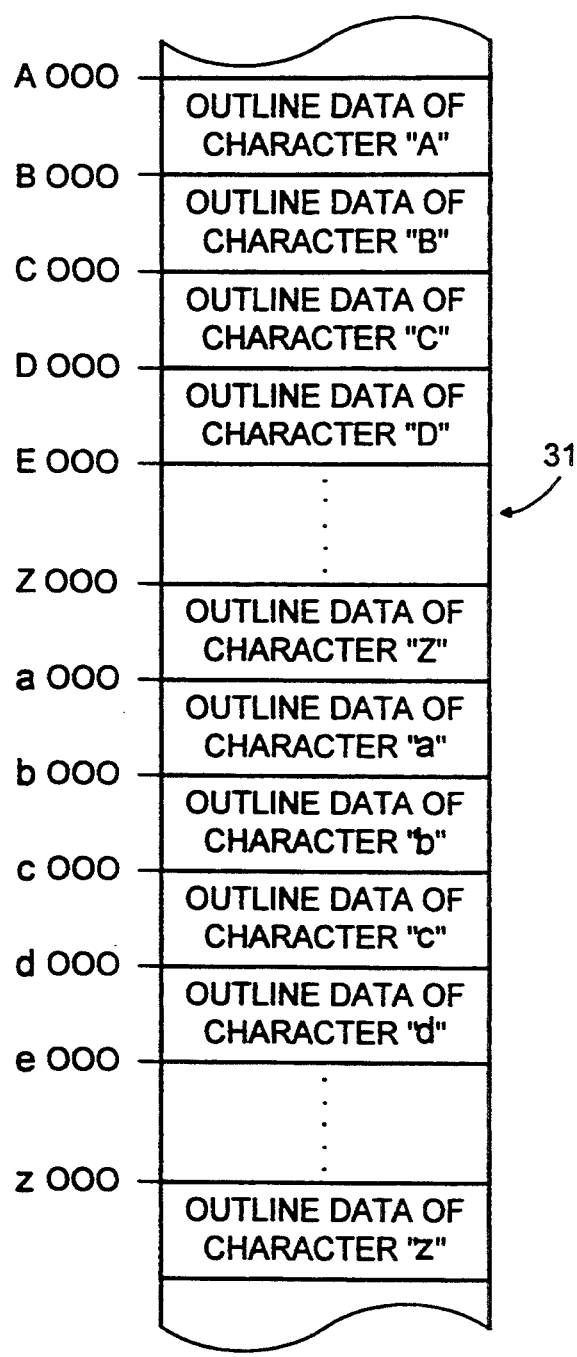
FIG. 4 is a diagram explaining the data structure In an outline data memory.

For example, as shown in FIG. 4, the outline data of the upper case alphabet characters "A" through "Z" are stored from address A000 through Z000. Further, the outline data of the lower case alphabet characters "a" through "z" are stored from address a000 through z000, respectively. Furthermore, outline data for many symbols is stored from predetermined addresses in a similar way.

The ROM 32 stores a display control program for controlling a display controller 23 according to the character codes of the characters and the symbol codes of numerals, symbols etc. input from the keyboard 3; an image development processing control program for converting outline data corresponding to each code data in a text memory 41 into print dot pattern data and transferring the same to a print buffer 43; a print drive control program for sequentially reading out data in the print buffer 43 to drive the thermal head 13 and tape feed motor 24; and a control program characteristic to the present invention for tape print control to be described later. Note, the image development processing control program includes the various kinds of subroutines for character modification processing control by which characters are subjected to bold facing, black/white image reversal processing, etc.

Further, the ROM 32 stores the normal character index table TB1 in which the character codes of the alphabet characters and the symbol codes of the numerals, symbols etc. address the outline data memory storing their respective outline data codes, as shown in FIG. 5; an upper case character index table TB2 in which the lower case character codes of the alphabet characters address the outline data memory 31 storing the corresponding upper case character outline data, as shown in FIG. 6; and a lower case character index table TB3 in which the upper case character codes of the alphabet address the outline data memory 31 storing the corresponding lower case character outline data, as shown in FIG. 7.

The test memory 41 of a RAM 40 stores the code data of characters and symbols input from the keyboard 3 as document data. A print format memory 42 stores a plurality of print format information such as set character size data and font data, selected character modification data, etc.. The print buffer 43 stores the print dot pattern data of a plurality of characters and symbols developed to images. Therefore, the print buffer 43 is provided with a memory capacity composed of 128 bits (16 bytes) corresponding to 128 dots in the longitudinal direction (dot column direction) and a predetermined number of dots for a plurality of characters in the lateral direction (dot row direction).

A print pointer (whose content has a print pointer value PP) 44 stores a single address of the text memory 41 for reading out a character code to be printed. A flag memory 45 stores the flag data for the three flags, corresponding to the three printing modes: all upper case (flag LF), normal (ie., unmodified, flag MF) or all lower case (flag SF). The flag is set high (ie., flag=1) when its corresponding mode is selected.

Figure 8:
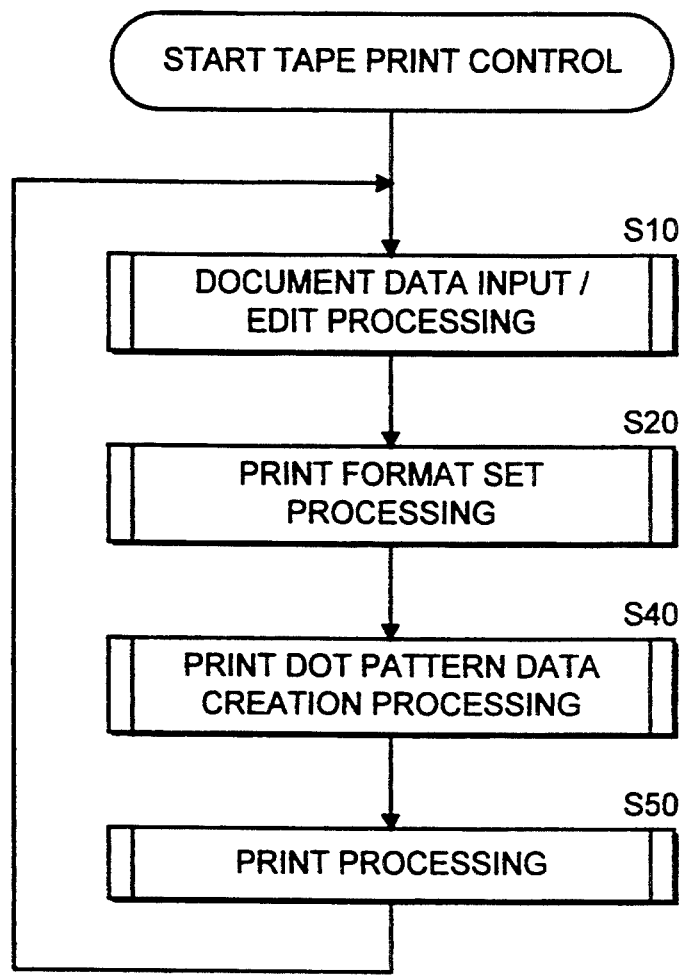
FIG. 8 is a flowchart of the tape print control routine.

Next, a tape print control routine executed by the control unit C of the tape printing device 1 will be schematically described with reference to the flowchart of FIG. 8. Note, the symbols Si (i=10, 20, 30 . . . ) in the figure represent respective steps.

When power is supplied by the actuation of the power supply key, the control starts. First, after the actuation of the document creation key, document data input/edit processing is executed (S10) to input code data corresponding to the character keys, space key and return key. Next, print format processing is executed (S20) by the actuation of the format set key.

This processing includes various processing for setting the print format such as character size set processing executed by the actuation of the size set key; font set processing executed by the actuation of the font set key; character mode set processing executed by the actuation of the character mode set key, etc. Next, dot pattern data creation processing is executed (S40) to create print dot pattern data in order to print the document data using the print key. This is followed by the print processing (S50) to output the dot pattern data to the print mechanism PM for printing, and then the process returns to S10. Note, with respect to the detail of the dot pattern data conversion processing control, refer to U.S. Pat. No. 5,188,469.

Figure 9:
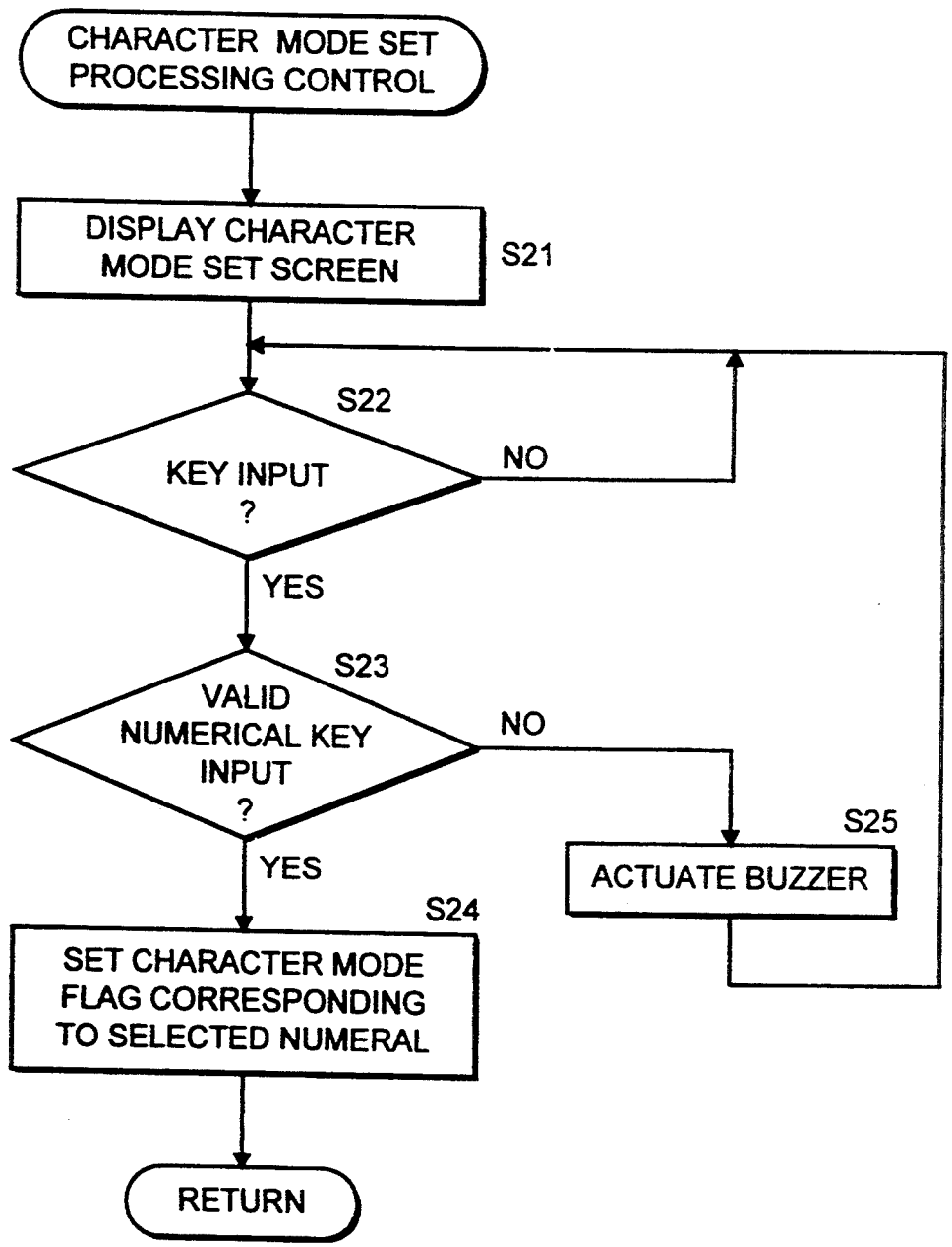
FIG. 9 is a flowchart of the character mode set processing control routine.

Next, the character mode set processing control routine executed at S20 will be described with reference to the flowchart of FIG. 9.

Figure 11:
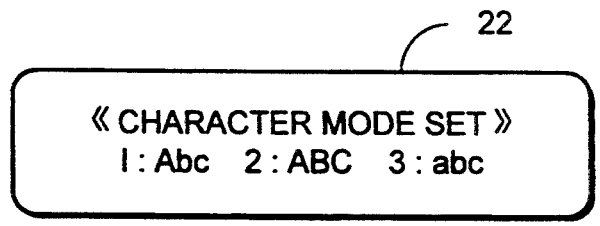
FIG. 11 is a diagram showing an example of the character mode setting screen.

When this routine first starts, a character mode set screen is displayed on the display unit 22 (S21). For example, as shown in FIG. 11, the display unit 22 displays the title <CHARACTER MODE SET> on the first line. Displayed on the second line are the choices: "Abc" (choice 1, normal mode); "ABC" (choice 2, upper case mode); and "abc" (choice 3, lower case mode). Then, when one of the valid numeral keys "1", "2" or "3" is actuated (S22, S23: Yes), the character mode flag MF, LF or SF corresponding to the selected numeral is set (S24) to end the routine, and the process returns to the tape print control. When, however, a key other than the valid numeral keys is actuated (S22: Yes, S23: No), the buzzer 20 is actuated (S25), and the process returns to S22.

Figure 10:
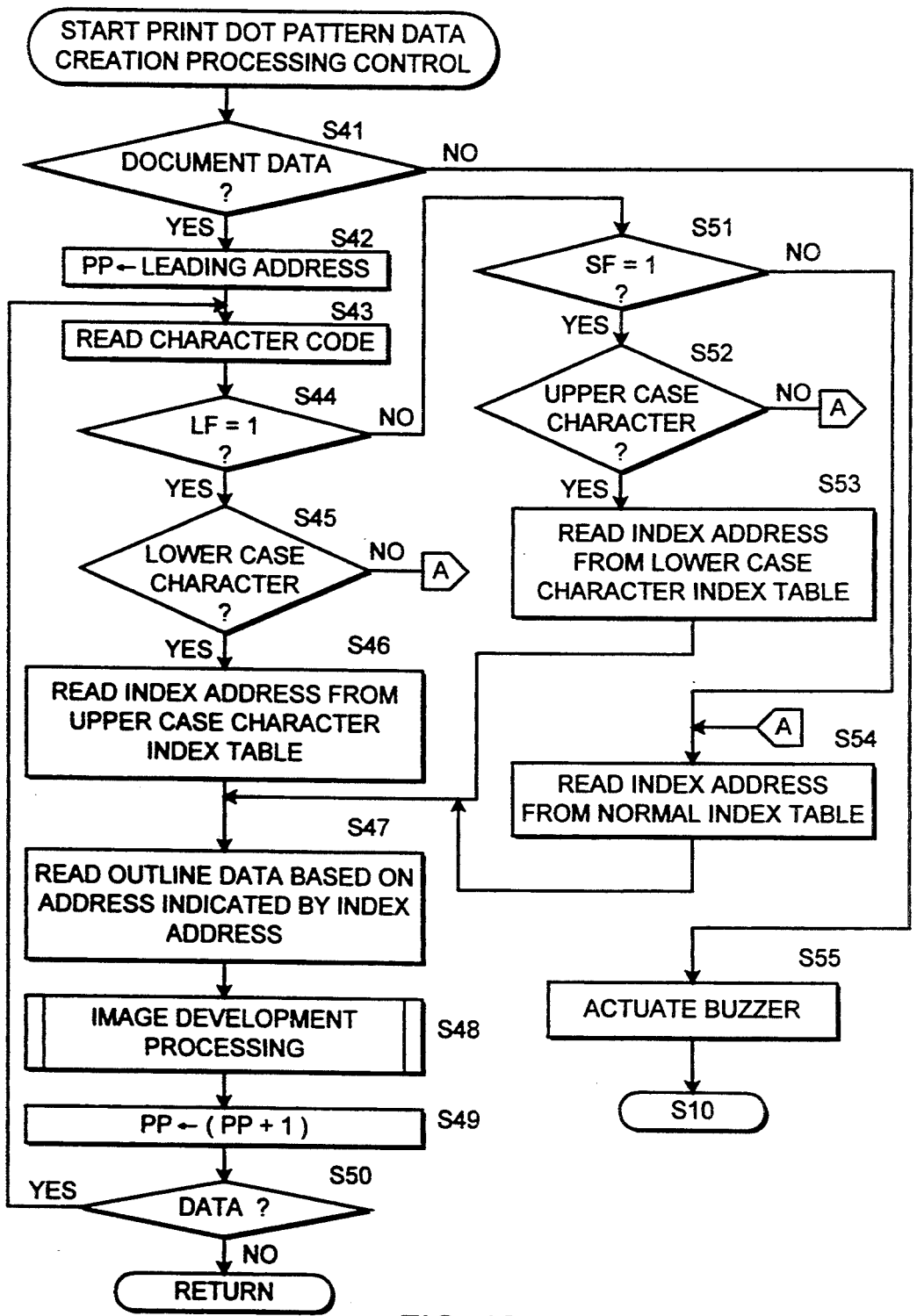
FIG. 10 is a flowchart of the print dot pattern data creation processing control routine.

Next, the print dot pattern data creation processing control routine executed at S40 will be described with reference to the flowchart of FIG. 10.

When this control starts and there is document data to be printed in the text memory 41 (S41: Yes), the leading address of the text memory 41 is set to the print pointer value PP (S42) and the character code indicated by print pointer value PP is read (S43). If the upper case character mode flag LF is set based on the flag data of the flag memory 45 (S44: Yes) and the character code is not the lower case character code, i.e., an upper case character code or symbol code (S45: No), an index address corresponding to the upper case character code or symbol code is read from the normal character index table TB1 (S54).

Next, based on tills index address, the stored outline data is sequentially read, using this index address, from the outline data memory 31 (S47). This outline data is subjected to expansion/reduction processing as well as being used to create the print dot pattern data. The image development processing is then executed to sequentially store the dot pattern data corresponding to the upper case characters and symbols (S48). Note, with respect to the detail of the dot pattern data development processing control, refer to U.S. Pat. No. 5,188,469.

Next, when the print pointer value PP is incremented by 1 (S49), if there is a character code of the address of the text memory 41 indicated by the print pointer value PP (S50: Yes), then step S43 and subsequent steps are repeated.

If the read character code is a lower case character code (S45: Yes), the index address of the corresponding upper case character is read from the upper case character index table TB2 (S46). Then, the corresponding dot pattern data is stored in the print buffer 43 at S47-S50, and the process returns to S43.

Then, when the image development has been completed with respect to all the characters in the text memory 41 (S50: No), the routine is ended, and the process returns to the tape print control routine of S10. Note, when there is no document data to be printed in the text memory 41 at the start of this routine (S41: No), the buzzer 20 is actuated (S55), and the process goes to S10 for the tape print control.

More specifically, when the upper case character mode is set, since the dot pattern data of upper case characters is created using the normal character index table TB1 (for upper case characters) and upper case character index table TB2 (for lower case characters), the print dot pattern data for the upper case alphabet characters can be easily created without editing the original document.

However, if the lower case mode flag SF is set (S44: No, S51: Yes) and the character code is not an upper case character code, i.e., a lower case character code or symbol code (S52: No), then the index address corresponding to the lower case character code or symbol code is read from the normal character index table TB1 (S54). Then, the image developing processing is executed to create the dot pattern data of a character other than an upper case character through S47-S50.

If the read character code is an upper case alphabet character (S52: Yes), then the index address of the corresponding lower case character is read from the lower case character index table TB3 (S53). Then, the corresponding dot pattern data is stored in the print buffer 43 at S47-S50, and the process returns to S43.

Then, when the image development has been completed with respect to all the characters in the text memory 41 (S50: No), this routine is ended and the process returns to the tape print control of S10.

More specifically, when the lower case character mode is set, since the dot pattern data of lower case characters is created using the normal character index table TB1 (for lower case characters) and lower case character index table TB3 (for upper case characters) the print dot pattern data for the lower case characters can be easily created without editing the original document. Thus the original text remains unchanged.

Further, if the normal (unmodified) character mode flag MF is set (S44, S51: No), the index addresses corresponding to the upper case character code, lower case character code and symbol code (S54) are read from the normal character index table TB1. Then, print dot pattern data is created through S47-S50 and the image development processing is executed to sequentially develop the print dot pattern data to the print buffer 43. Then, when the image development has been completed with respect to all the characters in the text memory 41 (S50: No), this routine is ended and the process returns to the tape print control of S10.

More specifically, when the normal character mode is set, the dot pattern data of the lower and upper case characters is created by the normal character index table TB1 for all the characters.

Here, the present invention can be applied even to the case which is prepared with an outline font dedicated to upper case characters in which only the outline data for symbols and upper case alphabet characters can be printed at all times, regardless of whether upper case characters or lower case characters are input.

Note, for a character generator storing the font data for a plurality of fonts, the index tables TB1, TB2, and TB3 can be provided for each font. It is noted that the present invention can be of course applied to various wordprocessing devices such as a wordprocessor having a dot print type print mechanism and that stores the print image of characters and symbols in dot pattern data.

It is further noted that the invention is not limited to the embodiment described above. The invention can be applied to devices incorporating a plurality of character modifications (ie. changing of the fonts, font size, and styles), as well as the storage in memory of a document, modified by this process.

Moreover, in the present embodiment all the characters are subjected to the same processing, but the selection of individual characters or groups of characters to be selectively processed is anticipated by this embodiment.

A tape printing device has been described as the preferred embodiment, but this invention may be applied to any word processing device having a data input function and a data output function. Thus the output data can be sent to another display device or another memory means such as a floppy disk.

What is claimed is:

1. A wordprocessing device which comprises:
    input means for inputting character codes, each of said character codes comprising a character and one of a plurality of attribute information;
    memory means for storing said character codes input through said input means;
    a character generator for generating output character data, each output character data comprising a character having one attribute;
    output attribute selecting means for selecting the attribute of the character to be outputted;
    an index means for mapping said input character codes to said output character data, said output character data having the attribute that is selected by said output attribute selecting means, wherein said index means maps said input character codes having a first of said plurality of attributes onto the output character data having a different one of said plurality of attributes; and
    output control means for outputting characters corresponding to said output character data with the attribute selected by said output attribute selecting means, with said stored input character codes remaining unchanged.

2. The wordprocessing device according to claim 1 wherein said plurality of attribute information comprises upper and lower character cases.

3. The wordprocessing device according to claim 1, wherein said index means further maps said input character codes having the second of said pair of attributes onto the output character data having the first of said pair of attributes.

4. The wordprocessing device according to claim 3, wherein said index means further maps said input character codes onto the output character data having the same attributes.

5. The wordprocessing device according to claim 1, wherein said output control means outputs said characters to a printer.

6. The wordprocessing device according to claim 1, wherein said output control means outputs said characters to a display.

7. The wordprocessing device according to claim 1, wherein said wordprocessing device comprises a tape printing device for printing characters on a tape like recording medium.

8. The tape printing device according to claim 7 wherein said recording medium is a tape housed in a cassette.

9. A tape printing device including:
    an input means for inputting character codes, said character codes comprising upper case character codes and lower case character codes;
    a memory means for storing said character codes input by said inputting means;
    a character generator having stored font data corresponding to said character codes, such that said font data is accessed by predetermined address data;
    said device further comprising:
    a first index means for designating respective address data corresponding to said character codes;
    a second index means for designating address data for upper case characters corresponding to lower case character codes;
    an upper case character output indication means for indicating that all of the characters are to be output as upper case characters; and an output means for outputting characters based upon upper case address data corresponding to upper case character codes designated by said first index means as well as upper case address data corresponding to lower case character codes designated by said second index means, if it is indicated by said upper case output indication means that every character is to be output as an upper case character;

wherein said output means comprises a print means for printing characters on a tape like recording medium; and wherein said inputted character codes stored in said memory means remain unchanged even after printing by said printing means.

10. The tape printing device according to claim 9 which further comprises:

a third index means for designating lower case address data corresponding to said upper case character codes; and a lower case character output indication means for indicating that all characters are to be outputted as lower case characters, wherein said output means outputs characters based upon lower case address data corresponding to lower case character codes designated by said first index means as well as lower case address data corresponding to upper case character codes designated by third index means, in the case that it is indicated by said lower case output indication means that every character is to be output as a lower case character.

11. The tape printing device according to claim 10 wherein said recording medium is a tape housed in a cassette.

12. The tape printing device according to claim 10 wherein each of said index means comprises means for mapping said character codes stored in said memory means to said font codes stored in said character generator.

13. The tape printing device according to claim 10 wherein character dot pattern data are stored in said character generator.

14. The tape printing device according to claim 10 wherein said upper case character output indication means and said lower case character output indication means comprise a common member.

* * * * *